US012643770B2

(12) United States Patent
McCarthy

(10) Patent No.: US 12,643,770 B2
(45) Date of Patent: Jun. 2, 2026

(54) METHODS OF MONITORING THE CONDITION OF ELEVATOR BELTS

(71) Applicant: TK Elevator Innovation and Operations GmbH, Duesseldorf (DE)

(72) Inventor: Mark McCarthy, Marietta, GA (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 1436 days.

(21) Appl. No.: 17/302,245

(22) Filed: Apr. 28, 2021

(65) Prior Publication Data

US 2021/0339984 A1 Nov. 4, 2021

Related U.S. Application Data

(60) Provisional application No. 63/017,245, filed on Apr. 29, 2020.

(51) Int. Cl.
B66B 7/12 (2006.01)
B66B 7/06 (2006.01)
G01N 27/20 (2006.01)

(52) U.S. Cl.
CPC ............ B66B 7/1223 (2013.01); B66B 7/062 (2013.01); G01N 27/20 (2013.01)

(58) Field of Classification Search
CPC ........ B66B 7/1223; B66B 7/062; G01N 27/20
USPC ......................................................... 187/393
See application file for complete search history.

(56) References Cited

U.S. PATENT DOCUMENTS

| | | | | |
|---|---|---|---|---|
| 8,011,479 B2 * | 9/2011 | Stucky | ................... | G01N 27/20 |
| | | | | 187/391 |
| 8,312,987 B2 * | 11/2012 | Lynn | ...................... | B65G 43/02 |
| | | | | 474/263 |
| 9,995,711 B2 * | 6/2018 | Garfinkel | ............... | G01N 27/20 |
| 11,198,591 B2 * | 12/2021 | Palazzola | ................. | B66B 7/06 |
| 2001/0045835 A1 * | 11/2001 | Ahmed | ................. | G01R 15/18 |
| | | | | 324/526 |
| 2014/0182974 A1 * | 7/2014 | Puranen | ................. | B66B 7/062 |
| | | | | 187/247 |

(Continued)

FOREIGN PATENT DOCUMENTS

| | | | | | | |
|---|---|---|---|---|---|---|
| BR | 112017023669 B1 * | 1/2022 | ....... | G01R 31/31723 |
| CN | 215005027 U * | 12/2021 |

(Continued)

*Primary Examiner* — Christina M Schreiber

(74) *Attorney, Agent, or Firm* — Dinsmore & Shohl LLP

(57) ABSTRACT

A method may be used to monitor the health of a belt in an elevator system. The belt may include first and second terminal ends, a plurality of conductive load carrier strands that extend between the first and second terminal ends, and a polymer material surrounding the strands. A measuring connection point may be located between a pair of adjacent carrier strands at each terminal end of the belt. The method may involve electrically connecting a measuring apparatus between the pair of strands at the measuring connection point at each terminal end and measuring an electrical characteristic at each connection point between at least one pair of strands. The electrical characteristic measured over the complete width of the belt gives a complete overview of the health of the belt, as a change in the measured electrical characteristic over time will be indicative of damage within one or more strands.

14 Claims, 5 Drawing Sheets

(56) References Cited

U.S. PATENT DOCUMENTS

| | | | | |
|---|---|---|---|---|
| 2015/0015280 A1* | 1/2015 | Guilani | ................. | B66B 5/0025 187/390 |
| 2015/0362450 A1* | 12/2015 | Lehtinen | ................. | B66B 19/02 187/391 |
| 2015/0375963 A1* | 12/2015 | Sun | ......................... | G01R 31/08 187/254 |
| 2016/0002006 A1* | 1/2016 | Sun | ......................... | G01R 17/00 187/254 |
| 2017/0008735 A1* | 1/2017 | Berben | ................. | B66B 5/0031 |
| 2018/0134520 A1* | 5/2018 | Mikkonen | ................. | B66B 7/08 |
| 2018/0215585 A1* | 8/2018 | Robibero | .............. | B66B 7/1215 |
| 2020/0122973 A1* | 4/2020 | Keyo | .................... | B66B 5/0025 |
| 2021/0190756 A1* | 6/2021 | Plaia | ...................... | D07B 1/145 |
| 2021/0339984 A1* | 11/2021 | McCarthy | ............ | B66B 7/1223 |
| 2022/0242697 A1* | 8/2022 | Palazzola | .............. | B66B 7/1223 |
| 2023/0140046 A1* | 5/2023 | Valjus | .................... | B66B 7/1223 187/393 |
| 2023/0227288 A1* | 7/2023 | Koskinen | .............. | B66B 5/0037 187/393 |
| 2023/0271808 A1* | 8/2023 | Evert | .................... | B66B 7/1215 187/264 |

FOREIGN PATENT DOCUMENTS

| | | | | | |
|---|---|---|---|---|---|
| EP | 1357073 | A1 * | 10/2003 | ................ | B66B 7/10 |
| EP | 3461779 | A1 * | 4/2019 | ........... | B66B 7/1223 |
| EP | 3495304 | A1 * | 6/2019 | ............ | G01N 27/20 |
| FI | 126182 | B * | 7/2016 | ............ | B66B 19/02 |
| WO | WO-2013151525 | A1 * | 10/2013 | ........... | B66B 7/1223 |
| WO | WO-2019081412 | A1 * | 5/2019 | ............. | B66B 7/062 |

* cited by examiner

METHODS OF MONITORING THE CONDITION OF ELEVATOR BELTS

CROSS-REFERENCE TO RELATED APPLICATIONS

This application claims priority to U.S. Provisional Application Ser. No. 63/017,245 filed Apr. 29, 2020, the entire contents of which is hereby incorporated by reference herein.

FIELD

The present disclosure generally relates to elevator systems, including methods for monitoring the condition of elevator belts in elevator systems.

BACKGROUND

All passenger moving systems, including elevators, escalators, and moving walks, are required by law to adhere to strict safety regulations in order to ensure passenger safety. Monitoring the condition of various component parts in these passenger moving systems forms part of the everyday operation and maintenance of such systems. In elevator systems, for example, monitoring the condition of a load-bearing part such as a belt, for instance, is of vital importance. The normal orientation of such a load-bearing part involves attaching one end of the belt to a load, such as an elevator cabin, attaching another end of the belt to a counterweight, and positioning the belt to travel along a sheave and pulley system to raise and lower the elevator cabin. Such load-bearing parts include an end termination at either one or both ends, where both ends allow for end-to-end belt monitoring capability.

Various methods of monitoring the condition of load-bearing parts exist. For example, European Patent No. EP3495304A1 discloses a method of health monitoring of a belt of an elevator system. The belt comprises a plurality of tension members having a metallized coating layer. A voltage is applied across the metalized coating to evaluate one or more electrical properties that correlate with and/or are indicative of the health of the belt.

U.S. Patent Publication No. 2015/0375963A1 discloses a method of fault detection of a belt or a rope that involves connecting a fault detection unit to at least a portion of a belt or rope that includes a plurality of wires. The portion of the belt or rope is subjected to a high-frequency AC voltage and an electrical impedance of the portion of the belt or rope is measured via the fault detection unit.

However, there are shortcomings to these approaches. For example, monitoring the condition of a rope using these approaches fails to address the problem that by connecting the belt or rope at a first end, the health of a second, unconnected end of the belt is under-represented. Therefore, the overall health information of the belt provided by these known approaches can be inaccurate.

SUMMARY

The present disclosure generally relates to methods for monitoring the condition of load-bearing members in passenger moving systems. For instance, the present disclosure relates to methods for monitoring the condition of elevator belts in elevator systems. In some examples, a belt may comprise a first terminal end, a second terminal end, a plurality of load carrier strands extending between the first and second terminal ends, and a polymer material surrounding the strands of the belt. Each strand may comprise at least one conductive (e.g., metallic) wire, and two adjacent strands may form a pair. Measuring points may be located between pairs of adjacent strands at each terminal end.

Some example methods may comprise electrically connecting a measuring apparatus between a pair of strands at a measuring connection point at each terminal end, and measuring at each connection point an electrical characteristic such as capacitance between the respective pair of strands. Those having ordinary skill in the art will understand that in some cases the same measuring apparatus may be used sequentially at each terminal end, although in other cases a different measuring apparatus may be employed at each end of the belt. Of course those having ordinary skill in the art will also recognize that in some cases an electrical characteristic or characteristics will be measured between numerous pairs of strands at each terminal end. Likewise, those having ordinary skill in the art will recognize that measurements may occur between all respective adjacent pairs of strands at both terminal ends of the belt. These steps advantageously allow capacitance, or some other electrical characteristic, to be measured over a complete width of the belt, thus giving a complete overview of the health of the belt because a change in the measured electrical characteristic(s) will be indicative of damage within one or more load carrier strand.

Damage within one or more load carrier strands can include, for example, a physical abnormality within one or more load carrier strand, a broken load carrier strand, and/or a faulty connection within at least one conductive wire comprised within one or more strand.

BRIEF DESCRIPTION OF THE FIGURES

FIG. 1a is a schematic view of a belt comprising a plurality of load carrier strands.

FIG. 1b is a schematic view depicting capacitance of two adjacent healthy load carrier strands from FIG. 1a.

DETAILED DESCRIPTION

Figures 1A, 1B:
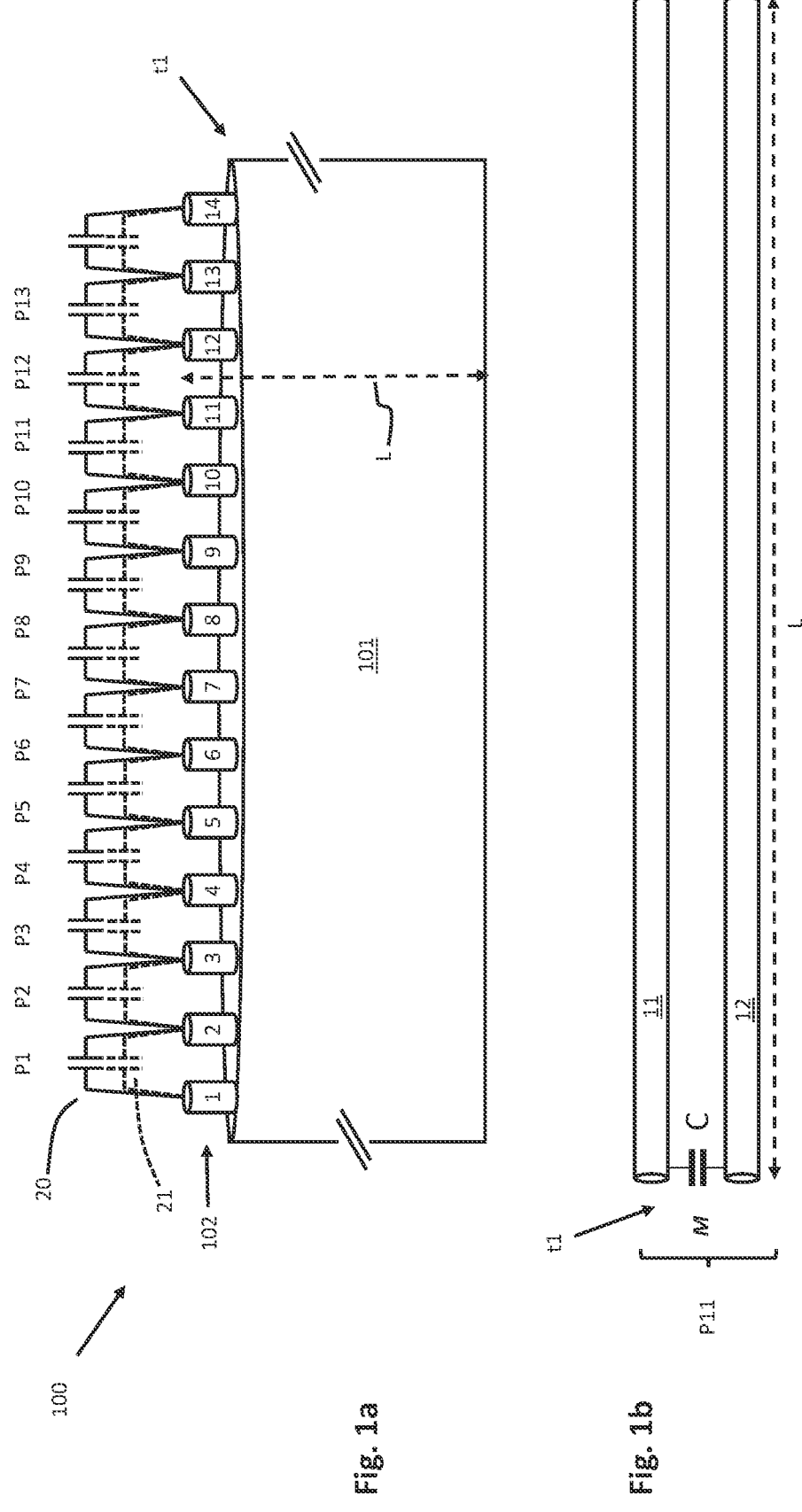

FIG. 1a shows a schematic representation according to the art of an elevator belt 100 in an elevator system. The belt 100 comprises a plurality of load carrier strands 1-14 encased within a polymer material 101. For ease of reference, terminal ends 102 of the load carrier strands 1-14 are shown protruding from the polymer material 101 at a terminal end t1 of the belt 100. Each load carrier strand 1-14 has a length L and comprises at least one metallic strand. Any two parallel metal wires that are in close proximity, but not touching, have a constant physical property of capacitance per unit of length "C", measured in pico Farads per foot (pF/ft). Variations in length, deformity, or damage to one or both wires in the pair will cause a decrease in the overall capacitance "Co" of the belt 100. Therefore, by treating two neighboring load carrier strands (e.g., the load carrier strands 11-12 in the elevator belt 100) as a capacitor and measuring its capacitance C over time, degradation and damage to one or both load carrier strands 11-12 will translate to a measurable decrease in the overall capacitance Co. The capacitance value C is regularly measured at measurement connection points M between each neighboring pair of load carrier strands 1-14 at the terminal end t1 of the belt 100. Load carrier strands 1 and 2 form a first pair P1, strands 2 and 3 form a second pair P2, and so on. When the load carrier strands 1-14 are healthy (i.e., have no defects or deterioration/damage), the overall capacitance Co is "normal" and is represented by the reference number 20. The quantitative value of the overall capacitance Co when the load carrier strands 1-14 are healthy may be referred to as a "baseline" for subsequent comparison purposes. Over time, however, general wear and tear will set in and cause the load carrier strands 1-14 to degrade, reducing the measured capacitance C accordingly (shown by reference number 21 and the dotted lines). The measured capacitance C for each pair of strands P1 to P13 will remain similar in value, but the overall capacitance Co will decrease, albeit not significantly. In FIG. 1*b*, the capacitance C is measured between the strands 11 and 12 (i.e., pair P11). Since the strands 11, 12 are not damaged, the overall capacitance Co remains normal.

When one or more load carrier strands 1-14 is damaged, the capacitance C is reduced (shown by reference number 22 in FIGS. 2*a*, 2*b*) causing a deviation of the overall capacitance Co from the baseline.

Figures 2A, 2B:
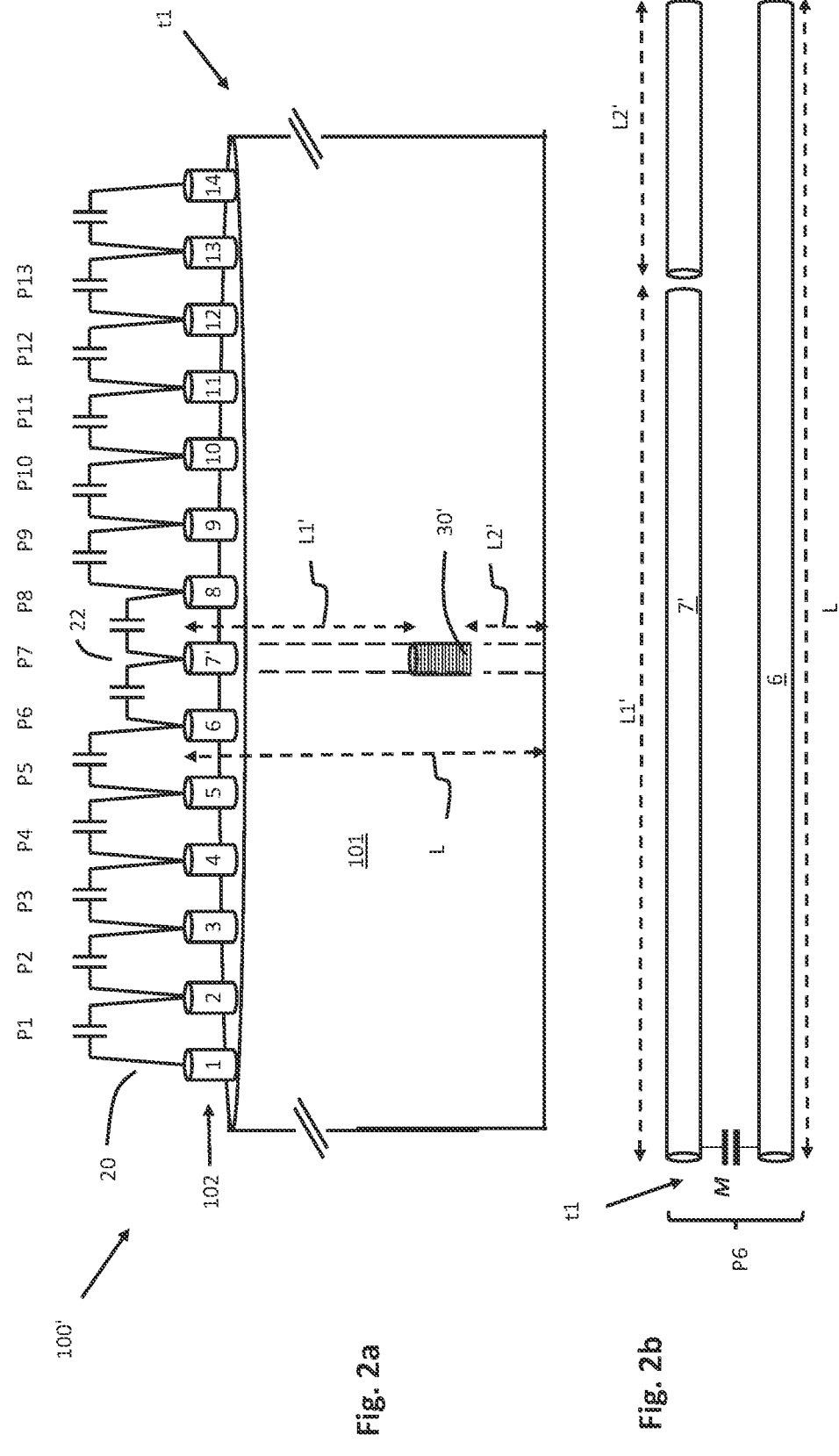
FIG. 2a is a schematic view of a belt comprising a plurality of load carrier strands, one of which is damaged.
FIG. 2b is a schematic view depicting capacitance of two adjacent load carrier strands from FIG. 2a, one of which is damaged.

In FIGS. 2*a* and 2*b*, a belt 100' similar to the belt 100 in FIGS. 1*a* and 1*b* is damaged and comprises a defect 30' in one of the load carrier strands 1-14. In this particular example, the load carrier strand 7' comprises the defect 30'. Instead of having length L, the damaged load carrier strand 7' now has a first length L1', and a second length L2', as shown more clearly in FIG. 2*b*. In this configuration, the load carrier strand 7' is equivalent to a fully functional but shorter load carrier strand with length L1'.

The damaged load carrier strand 7' forms a pair P6 with strand 6 and forms a pair P7 with strand 8. Therefore, two pairs of load carrier strands are affected. Since the capacitance measured between the pairs P6, P7 is dependent on their respective strand lengths, the defect 30' causes the capacitance C' of each pair P6, P7 to decrease. The extent of the decrease, however, is dependent on the location and severity of the damage/defect 30' within the belt 100'. For example, the farther the defect 30' is from the measurement point M at the terminal end t1 of the belt 100', the lesser the change in capacitance C'. In this particular example, the defect 30' is located at a distance from the measurement point M that's equivalent to three quarters of the total length L. Therefore, the effective length L1' of the damaged load carrier strand 7' is:

$$L1' = 0.75\ L.$$

Therefore, the capacitance C' for pairs P6 and P7 can be represented by either of the following two equations, wherein the characters in the square brackets identify the particular load carrier strand 6, 7', 8 and are not part of the equations.

$$C' = (L1'[7'] + L[6]) + (L1'[7'] + L[8]) \qquad \text{i.}$$

$$C' = (0.75L[7'] + L[6]) + (0.75L[7'] + L[8]) \qquad \text{ii.}$$

The capacitance C' measured for the pairs P6 and P7 could also be represented as:

$$C' = 0.75C \text{ (wherein C is the capacitance measured}$$
for any one of the remaining pairs P1-P5,
P8-P13). iii.

The reduction in capacitance C' of pairs P6 and P7 causes the overall capacitance Co' for the belt 100' to reduce significantly, thereby alerting the technician that a fault is present and a maintenance operation should be conducted. The defect 30' may originate from various causes such as, for example, general wear of the load carrier strand 7' or a random physical abnormality.

Figures 3A, 3B:
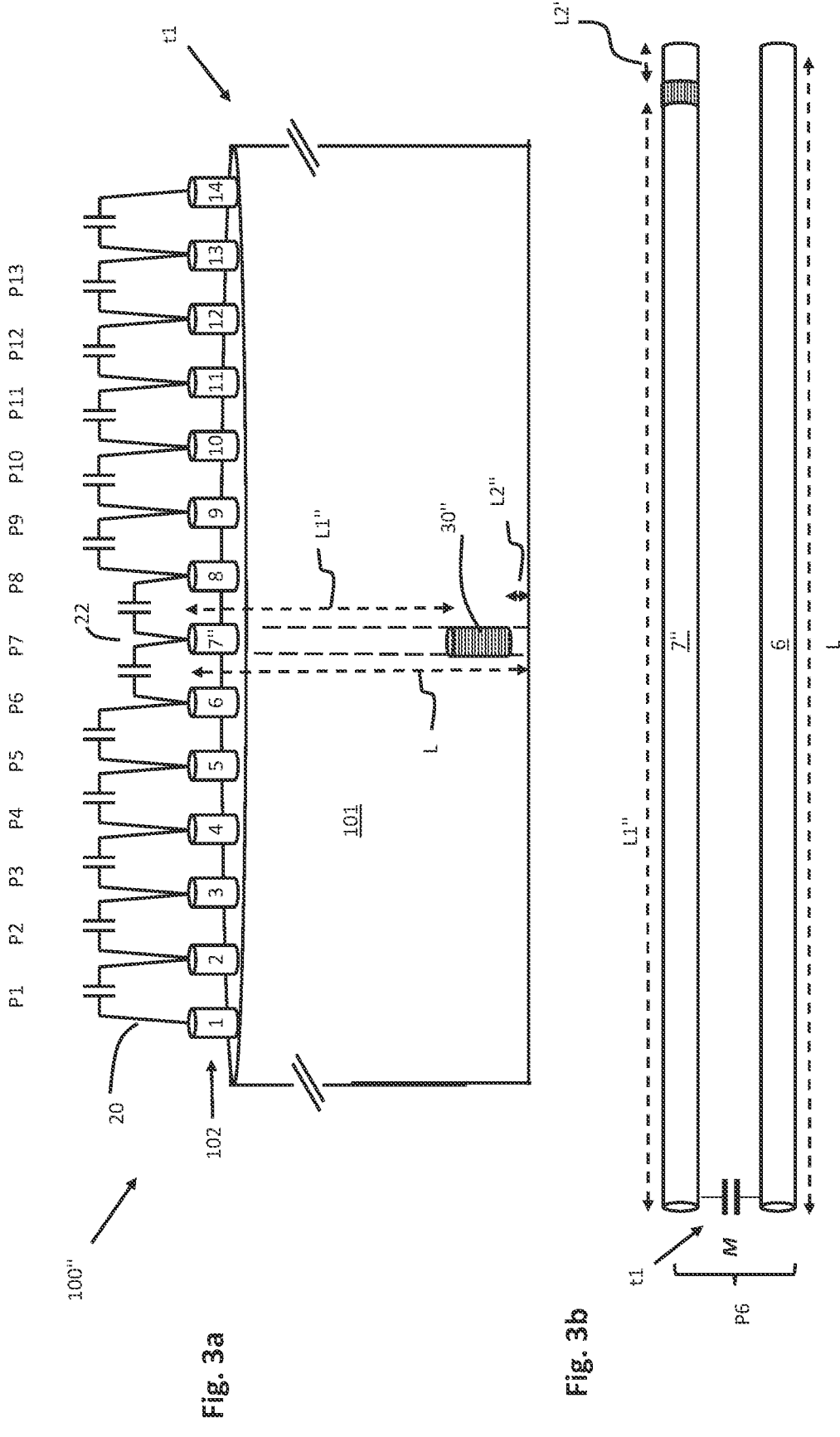
FIG. 3a is a schematic view of a belt comprising a plurality of load carrier strands, one of which is damaged.
FIG. 3b is a schematic view depicting capacitance of two adjacent load carrier strands from FIG. 3a, one of which is damaged.

In FIGS. 3*a* and 3*b*, a belt 100" also has a defect 30" in the load carrier strand 7". Instead of having length L, the damaged load carrier strand 7" now has a first length L1", and a second length L2", as shown more clearly in FIG. 3*b*. In this configuration, the load carrier strand 7" is equivalent to a fully functional but shorter load carrier strand with length L1".

In this particular example, the defect 30" is located at a distance from the measurement point M that's equivalent to 97% of the total length L. In other words, the defect 30" is at the opposite side of the load carrier strand 7" when measured from the perspective of the measurement point M, which is one of the most difficult points in the entire load carrier strand 7" to measure from the measurement point M. Nevertheless, the effective length L1" of the damaged load carrier strand 7" is:

$$L1" = 0.97\ L.$$

Since the extent of the decrease in capacitance C" is dependent on the location and severity of the damage/defect 30" within the belt 100", and this particular defect is located at the opposite end of the belt 100", the change in capacitance C" will be much harder to detect and thus highly accurate measuring equipment is required. Also, the farther the damage/defect 30" from the point of measurement M, the smaller the change in capacitance. Therefore, the defect 30" may ultimately go undetected and/or a capacitance reading for this particular belt 100" is likely to be inaccurate, either of which can compromise passenger safety and the integrity of the elevator system as a whole.

The solution of the present disclosure is explained via reference to FIGS. 4*a* to 5*b*. In general, methods of the present disclosure comprise taking measurements at both terminal ends t1, t2 of a belt 100'''. By making capacitance measurements at both terminal ends t1, t2 of the belt 100''', detection ability is greatly improved. Any damage near either terminal end t1, t2 of the belt 100''' will be more easily and more reliably detected, thereby helping to ensure the integrity of the elevator belt 100'''.

Figures 4A, 4B:
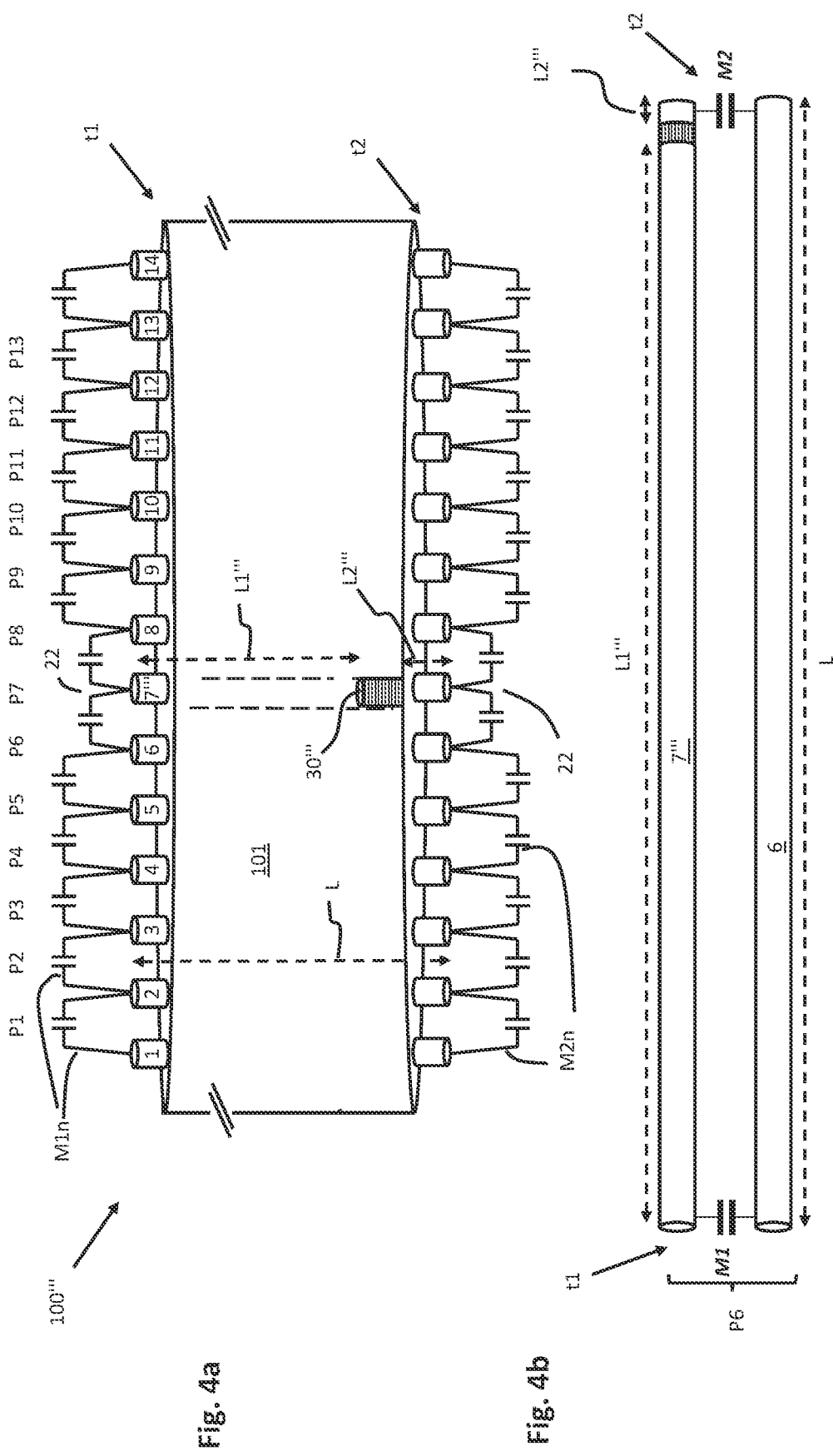
FIG. 4a is a schematic view of an example belt of the present disclosure comprising a plurality of load carrier strands, one of which is damaged.
FIG. 4b is a schematic view depicting capacitance of two adjacent load carrier strands from FIG. 4a, one of which is damaged.

FIG. 4*a* is a schematic view of the elevator belt 100''', similar to those belts described above. Some example methods of the present disclosure may comprise measuring the capacitance value C''' at measurement connection points M1, M2 between each neighboring pair of load carrier strands 1-14 at both terminal ends t1, t2 of the belt 100''', as depicted in FIG. 4*b*. The load carrier strands 1 and 2 form a first pair P1, the strands 2 and 3 form a second pair P2, and so on.

The example load carrier strand 7''' in FIGS. 4*a*, 4*b* comprises a defect 30'''. Instead of having length L, the damaged load carrier strand 7''' now has a first length L1''', and a second length L2''', as shown more clearly in FIG. 4*b*. In this configuration, the load carrier strand 7''' is equivalent to a fully functional but shorter load carrier strand with length L1'''.

As explained above, the damaged load carrier strand 7''' forms a pair P6 with the strand 6 and a pair P7 with the strand 8, and both pairs P6, P7 of load carrier strands are affected. Since the capacitance measured between the pairs P6, P7 is dependent on their respective strand lengths, the defect 30''' causes the capacitance C''' of each pair P6, P7 to decrease. The extent of the decrease, though, depends on the location and severity of the damage/defect 30''' within the belt 100'''. Since measurements are made at each end of the load carrier strand 7''', the most difficult point to evaluate along the strand 7''' now becomes the center of the strand 7'''. Notwithstanding, changes in capacitance will be comparatively higher than would be detected with prior art methods. Thus detecting damage/defects becomes easier and more reliable.

In this particular example, the defect 30''' is located at the same distance as the defect shown in FIGS. 3*a* and 3*b*. This time, however, with the measurement point being at position M2 as well as M1, the defect 30''' is much closer to a measuring point. The effective length L1''' of the damaged load carrier strand 7''' is:

$$L1'''=0.97L.$$

The change in capacitance now becomes much easier to detect since the defect 30''' is very close to the measurement point M2. There will be a significant change in capacitance measured at M2, whilst the change measured at M1 will be negligible in comparison.

With respect to measurement at the point M2, the capacitance C''' for pairs P6 and P7 when measured at point M2 can be represented by either of the following two equations. The characters in square brackets represent the particular load carrier strands 6, 7''', 8 and are not part of the equations.

$$C'''=(L2'''[7''']+L[6])+(L2'''[7''']+L[8]) \qquad \text{i.}$$

$$C'''=(0.03L[7''']+L[6])+(0.03L[7''']+L[8]) \qquad \text{ii.}$$

And the capacitance C''' when measured at the measurement point M2 for the pairs P6 and P7 could also be represented as:

$$C'''=0.03C \qquad \text{iii.}$$

(wherein C is the capacitance measured for any one of the remaining pairs P1-P5, P8-P13).

With respect to measurement at the point M1, the capacitance C''' for pairs P6 and P7 when measured at point M1 can be represented by either of the following two equations. The characters in square brackets represent the particular load carrier strands 6, 7''', 8 and are not part of the equations.

$$C'''=(L1'''[7''']+L[6])+(L1'''[7''']+L[8]) \qquad \text{i.}$$

$$C'''=(0.97L[7''']+L[6])+(0.97L[7''']+L[8]) \qquad \text{ii.}$$

And the capacitance C''' when measured at the measurement point M1 for the pairs P6 and P7 could also be represented as:

$$C'''=0.97C \qquad \text{iii.}$$

(wherein C is the capacitance measured for any one of the remaining pairs P1-P5, P8-P13).

Figures 5A, 5B:
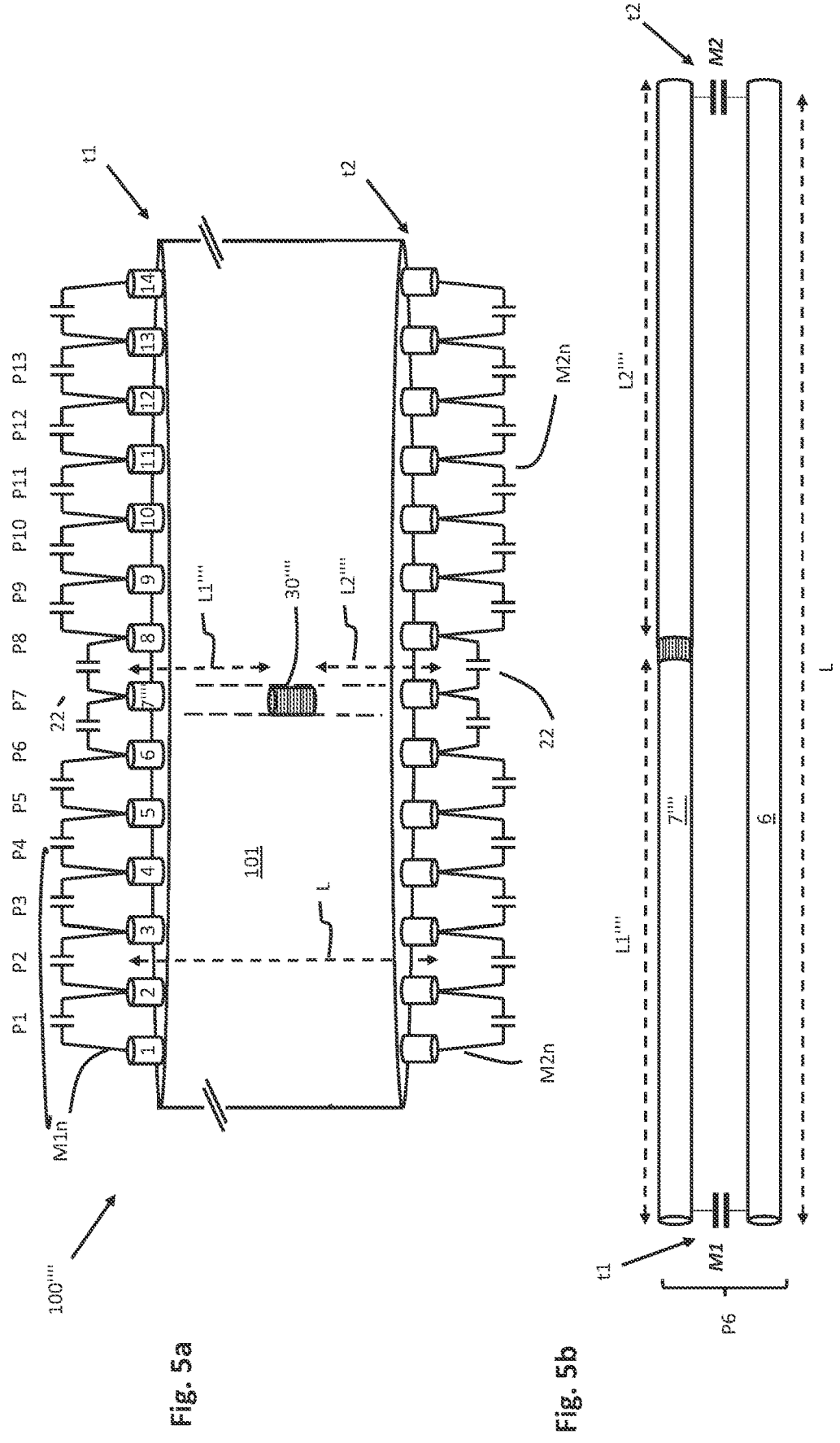
FIG. 5a is a schematic view of an example belt of the present disclosure comprising a plurality of load carrier strands, one of which is damaged.
FIG. 5b is a schematic view depicting capacitance of two adjacent load carrier strands from FIG. 5a, one of which is damaged.

In FIGS. 5*a* and 5*b*, a defect 30'''' in a load carrier 7'''' is located in the middle of the strand such that it has a length L1'''' and L2'''', wherein $$L1''''=L2''''=0.5L.$$

Since the defect 30'''' is equidistant from measurement points M1 and M2, the capacitance C'''' for the pairs P6 and P7 when measured at either M1 or M2 can be represented by any of the following two equations. The characters in square brackets represent the particular load carrier strands 6, 7'''', 8 and are not part of the equations.

$$C''''=(L1''''[7'''']+L[6])+(L1''''[7'''']+L[8]) \qquad \text{i.}$$

wherein L1''''=L2''''

$$C''''=(0.5L[7'''']+L[6])+(0.5L[7'''']+L[8]) \qquad \text{ii.}$$

The capacitance C'''' when measured at either measurement point M1 or M2 for the pairs P6 and P7 could also be represented as:

$$C''''=0.5C \qquad \text{iii.}$$

(wherein C is the capacitance measured for any one of the remaining pairs P1-P5, P8-P13).

By measuring at both measurement points M1, M2, each respective capacitance reading should show a decrease of similar or equivalent degree. A break in the middle of a load carrier strand 7'''' is effectively a worst-case scenario from a measurement perspective. If the break is farther from the measurement point M1, it becomes closer to the measurement point M2, and the measurement point M2 will have a greater change in its capacitance measurement and vice versa. Damage at the midpoint causes the smallest possible change in measurement for both measurement points M1 and M2. Yet it is still a 50% change in capacitance measurement from nominal. For partial damage and incomplete breaks, this same logic holds but the capacitance measurement change will depend on the level of damage.

Using the methods of the present disclosure and measuring capacitance at both ends of belts, any changes can be more easily and reliably detected. This in turn enables earlier and improved detection of a possible deterioration/defect within any one or more load carrier strands. Likewise, measuring from both ends allows one to better approximate a location between terminal ends of the belt where a defect exists. Damage or defects can also be detected if the measured capacitances of two pairs of load carrier strands deviate disproportionately from an average or median value of the measured capacitances of the other pairs of load carrier strands. Consequently, both passenger safety and the condition monitoring process are improved.

Whilst this present disclosure relates to measuring capacitance, the method of measuring at both terminal ends of a belt can be applied to any electrical characteristic in order to provide condition monitoring. Further, it should be understood that the appended figures are not necessarily to scale and present a simplified representation of various features illustrative of the basic principles of the invention. The specific design features of the present disclosure such as dimensions, orientations, locations, and shapes, for example, will be determined by the particular intended application and use environment. Accordingly, the foregoing description is intended to be illustrative rather than restrictive. The assembly of the present disclosure described hereinabove is defined by the claims, and all changes that fall within the meaning and range of equivalency of the claims are to be embraced within their scope.

7

REFERENCE CHARACTERS

C strand pair capacitance
Co overall belt capacitance
L length of complete load carrier strand
L1, L2 length of damaged load carrier strand
M measurement connection
M1, M2 measurement connection
M1n, M2n measurement connection
P1-P13 pair of load carrier strands
t1, t2 belt terminal end
100 belt
101 polymer material
102 terminal ends of load carrier strands
1-14 load carrier strand
30 damage/defect
20 C of strand pair
21 C of strand pair with general wear
22 C of strand pair with defect

What is claimed is:

1. A method for monitoring a condition of an elevator belt, the method comprising:
  connecting a first measuring apparatus to a first pair of adjacent load carrier strands at a first terminal end of the elevator belt;
  measuring an electrical characteristic between the first pair of adjacent load carrier strands at the first terminal end of the elevator belt to obtain a first measurement by the first measuring apparatus;
  connecting the first measuring apparatus or a second measuring apparatus to the first pair of adjacent load carrier strands at a second terminal end of the elevator belt;
  measuring the electrical characteristic between the first pair of adjacent load carrier strands at the second terminal end of the elevator belt to obtain a second measurement by the first measuring apparatus or the second measuring apparatus, respectively;
  comparing the first measurement and the second measurement to a baseline value or previously-obtained first and second measurements, respectively obtained by the first measuring apparatus or the second measuring apparatus; and
  alerting a technician that a fault is present and a maintenance operation is required when the comparison of the electrical characteristic indicates a change in the electrical characteristic by a predetermined amount.

2. The method of claim 1, comprising measuring, via the first measuring apparatus or the second measuring apparatus, the electrical characteristic between all pairs of adjacent load carrier strands at the first and second terminal ends of the elevator belt to obtain a plurality of measurements.

3. The method of claim 2, wherein the plurality of measurements comprise the first and second measurements, the method comprising comparing the plurality of measurements respectively to previously-obtained measurements of the electrical characteristic for all pairs of adjacent load carrier strands at the first and second terminal ends of the elevator belt.

4. The method of claim 1, comprising comparing the first measurement to the second measurement.

5. The method of claim 1, comprising:
  measuring, via the first measuring apparatus or the second measuring apparatus, the electrical characteristic between a second pair of adjacent load carrier strands at the first terminal end of the elevator belt to obtain a third measurement;

measuring, via the first measuring apparatus or the second measuring apparatus, the electrical characteristic between the second pair of adjacent load carrier strands at the second terminal end of the elevator belt to obtain a fourth measurement;
  comparing the first measurement to the third measurement; and
  comparing the second measurement to the fourth measurement.

6. A method for monitoring a condition of an elevator belt, the method comprising:
  measuring, via a first measuring apparatus, an electrical characteristic between a first pair of adjacent load carrier strands at a first terminal end of the elevator belt to obtain a first measurement;
  measuring, via the first measuring apparatus or a second measuring apparatus, the electrical characteristic between the first pair of adjacent load carrier strands at a second terminal end of the elevator belt to obtain a second measurement;
  comparing the first measurement and the second measurement to a baseline value or previously-obtained first and second measurements, respectively obtained by the first measuring apparatus or the second measuring apparatus; and
  alerting a technician that a fault is present and a maintenance operation is required when the comparison of the electrical characteristic indicates a change in the electrical characteristic by a predetermined amount.

7. The method of claim 6, comprising comparing the first and second measurements obtained via the first measuring apparatus or the second measuring apparatus respectively to previously-obtained measurements of the electrical characteristic for the first pair of adjacent load carrier strands from the first and second terminal ends of the elevator belt.

8. The method of claim 6, comprising measuring, via the first measuring apparatus or the second measuring apparatus, the electrical characteristic between all pairs of adjacent load carrier strands at the first and second terminal ends of the elevator belt to obtain a plurality of measurements.

9. The method of claim 8, wherein the plurality of measurements comprise the first and second measurements, the method comprising comparing the plurality of measurements respectively to previously-obtained measurements of the electrical characteristic for all pairs of adjacent load carrier strands at the first and second terminal ends of the elevator belt.

10. The method of claim 6, comprising approximating where between the first and second terminal ends of the elevator belt a defect exists based on the first and second measurements.

11. The method of claim 6, wherein the electrical characteristic is capacitance.

12. A method for monitoring a condition of an elevator belt in an elevator system, wherein the elevator belt comprises a first terminal end, a second terminal end, load carrier strands extending between the first and second terminal ends, with each strand comprising a conductive wire, and a polymer material surrounding the load carrier strands, wherein a measuring connection point is located between each strand at each terminal end, wherein two adjacent load carrier strands form a pair, the method comprising:
  electrically connecting a measuring apparatus between a pair of the load carrier strands at a measuring connection point at each terminal end; and
  measuring, via the measuring apparatus, at each measuring connection point an electrical characteristic between at least one pair of load carrier strands such that a change in the electrical characteristic is indicative of damage within one or more load carrier strand comparing the first measurement and the second measurement to a baseline value or previously-obtained first and second measurements, respectively obtained by the measuring apparatus; and alerting a technician that a fault is present and a maintenance operation is required when the comparison of the electrical characteristic indicates a change in the electrical characteristic by a predetermined amount.

13. The method of claim 12, wherein the electrical characteristic is capacitance.

14. The method of claim 12, wherein the fault is a damage that includes a physical abnormality within one or more load carrier strand, a broken load carrier strand, or a faulty connection within at least one conductive wire within one or more strand.

\* \* \* \* \*